May 7, 1968     W. L. WELLS     3,381,574
APPARATUS FOR DISPLAYING A PROJECTED MICROFILM
IMAGE OF A DRAWING

Filed Aug. 31, 1965     4 Sheets-Sheet 1

INVENTOR:
WILLIS L. WELLS
BY Gravely, Lieder & Woodruff
ATTORNEYS.

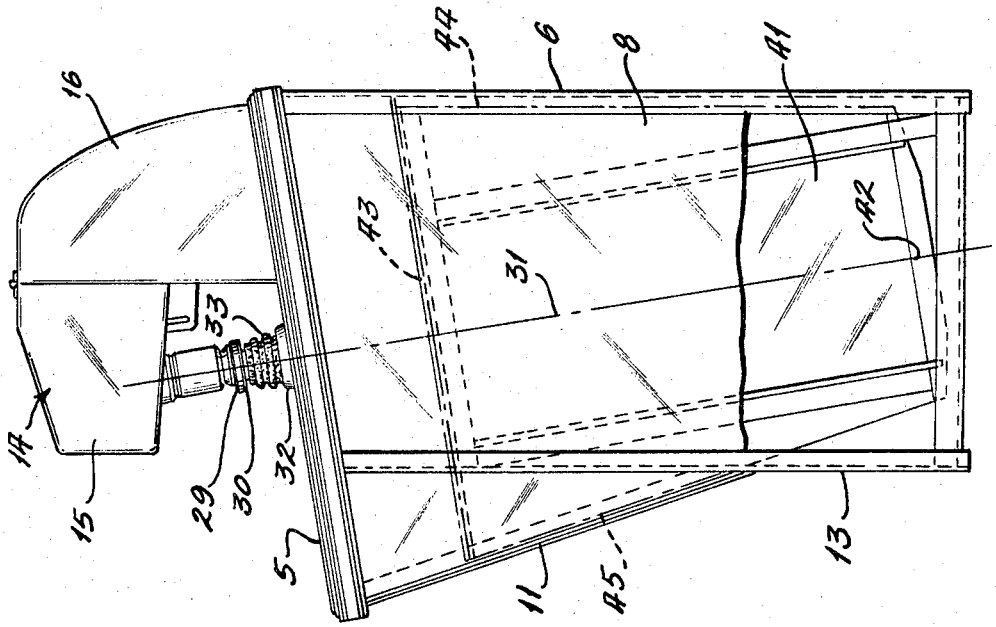
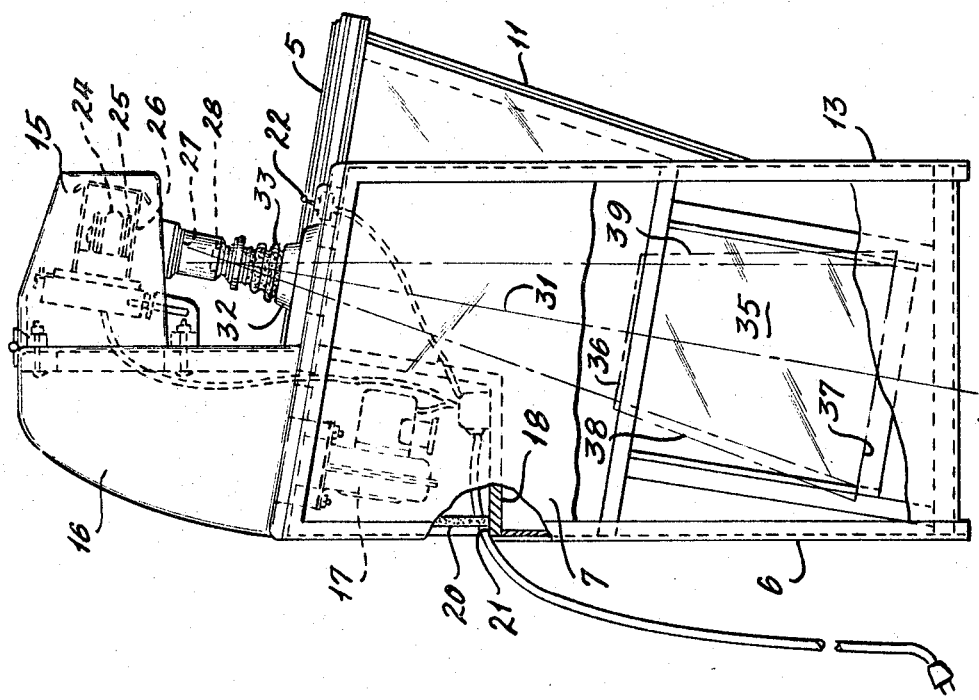

May 7, 1968  W. L. WELLS  3,381,574
APPARATUS FOR DISPLAYING A PROJECTED MICROFILM
IMAGE OF A DRAWING
Filed Aug. 31, 1965  4 Sheets-Sheet 4

INVENTOR:
WILLIS L. WELLS
BY Gravely, Lieder & Woodruff
ATTORNEYS.

3,381,574
APPARATUS FOR DISPLAYING A PROJECTED MICROFILM IMAGE OF A DRAWING
Willis L. Wells, Clayton, Mo., assignor to Photronix, Inc., St. Louis, Mo., a corporation of Missouri
Filed Aug. 31, 1965, Ser. No. 483,950
4 Claims. (Cl. 88—24)

ABSTRACT OF THE DISCLOSURE

A film viewing machine having an image exposure section, an image reflecting and enlargement section, a top portion beneath which an image is projected in an upward direction, and a sloping upper front wall to permit a full enlarged projection to be received on the underside of a translucent table surface.

---

Figure 1:
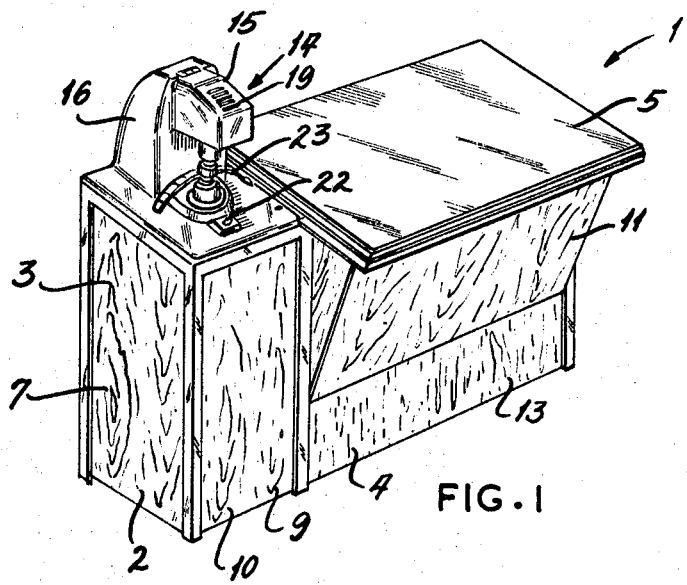

This invention relates generally to film readers, but more particularly, to a film reader wherein the image from microfilm is projected on a large sloping surface of about the size usually used by draftsmen, architects and engineers, the projection being in such a manner that the image is distortion free and is enlarged to scale over the entire large surface area.

In the past, there have been numerous kinds of film readers. Many of these simply take microfilm and project the image from it on a screen so that it can be viewed in its enlarged form with the naked eye. No attempt is made to enlarge the image exactly to scale over its entire surface area, and such exactness is not required in many instances. In other cases, the prior machines projected the image on a sloping surface, but one which was either relatively small or one which was large but had distortion in it so that plans or drawings could not be accurately scaled at all points over their entire surface.

One of the principal objects of the present invention is to provide a film viewing machine with a relatively large viewing surface comparable in size to that used by many draftsmen, architects, and engineers, in which microfilm is enlarged to scale over the entire viewing surface so that one inch measures one inch at the edge of the viewing surface and measures one inch in the center thereof. Another objects is to provide a viewing surface which can be used in the same manner as a drafting table with a drawing mounted thereon. Another object is to provide a viewing surface on which tracing paper may be placed and plans traced thereover both quickly and accurately to scale. Another object is to provide a machine in which the microfilm image is enlarged to scale accurately, so that plans can be sent through the mail as a small package of microfilm instead of a large heavy tube of blueprints in rolled form. Another object is to provide a compact construction for such a machine, so that it is not too bulky, provides a large working and viewing area, and can be used conveniently by a person either in the sitting or standing position. Another object is to provide a film viewer having a projector at the left and above the work surface with two mirrors within the cabinet near the bottom thereof, one mirror being directly below the work surface and having a portion extending forwardly into the sloping upper front surface of the cabinet.

These and other objects and advantages will become apparent hereinafter.

The invention is embodied in a film viewing machine having an image exposure section, an image reflecting and enlargement section, said machine having a top portion beneath which an image is projected, said machine having a sloping upper front wall.

Figure 3:
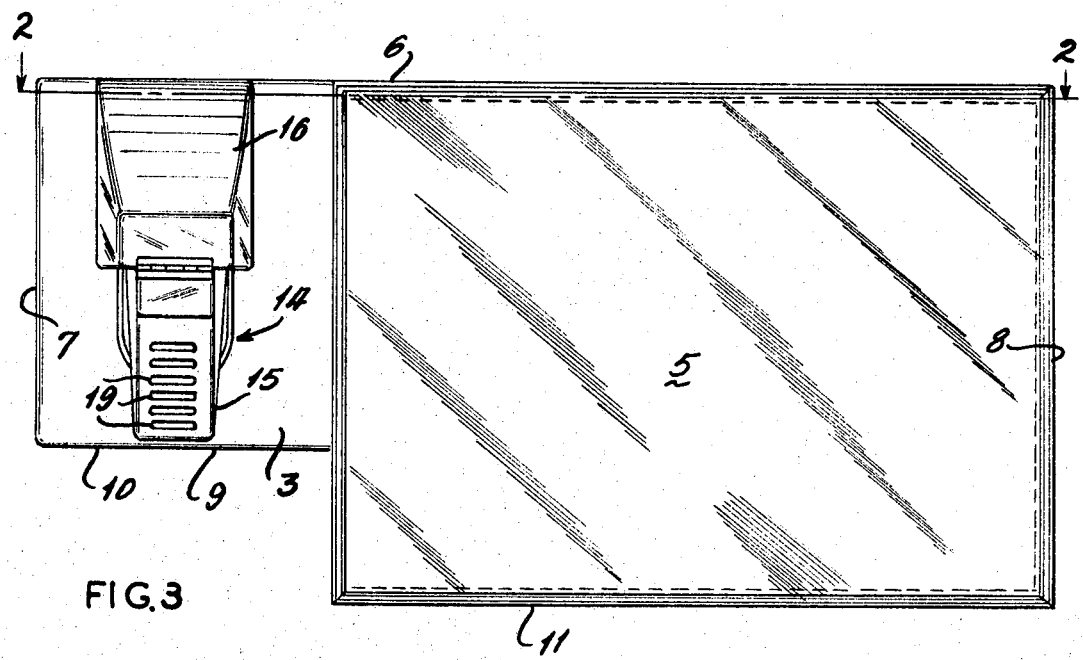
Figure 2:
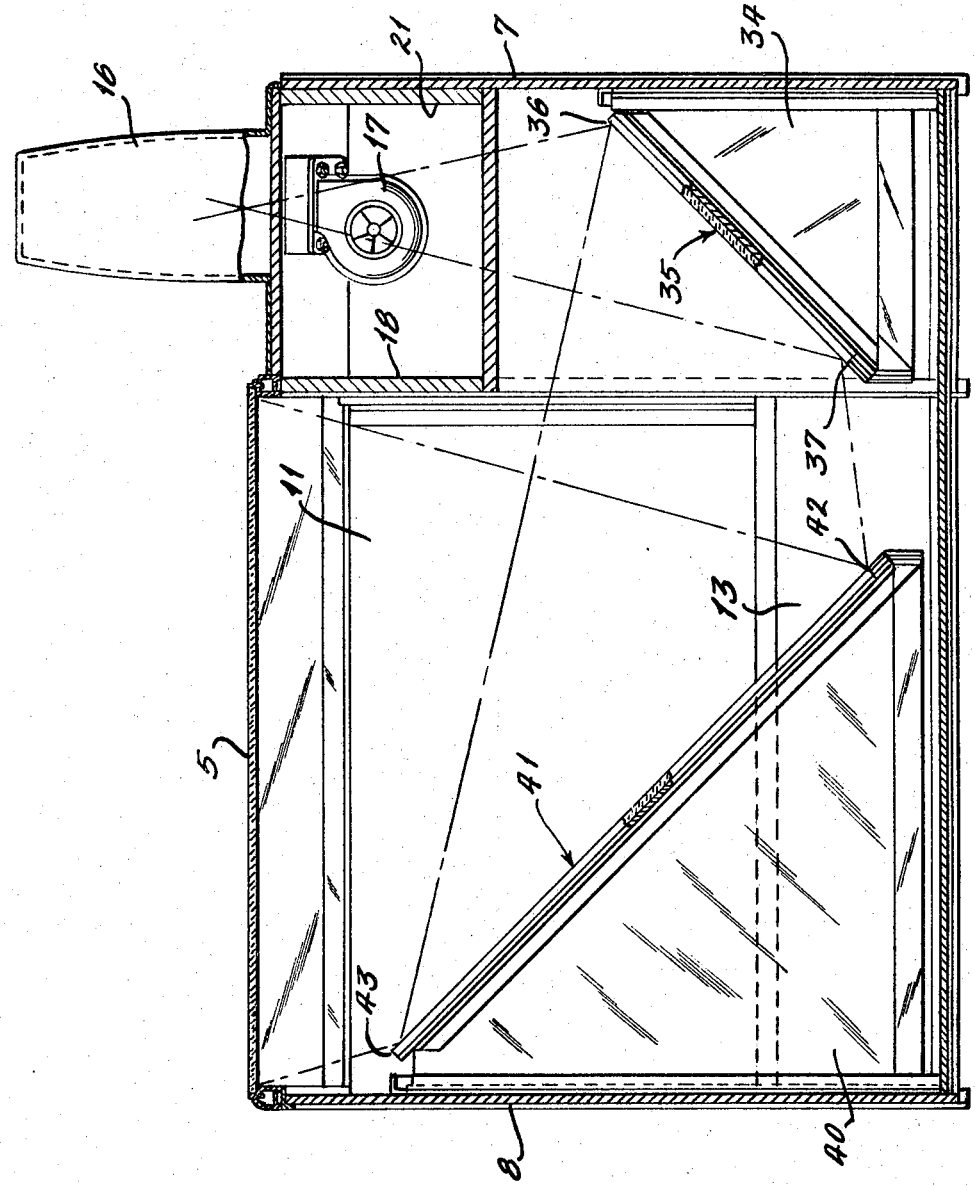
Figure 6:
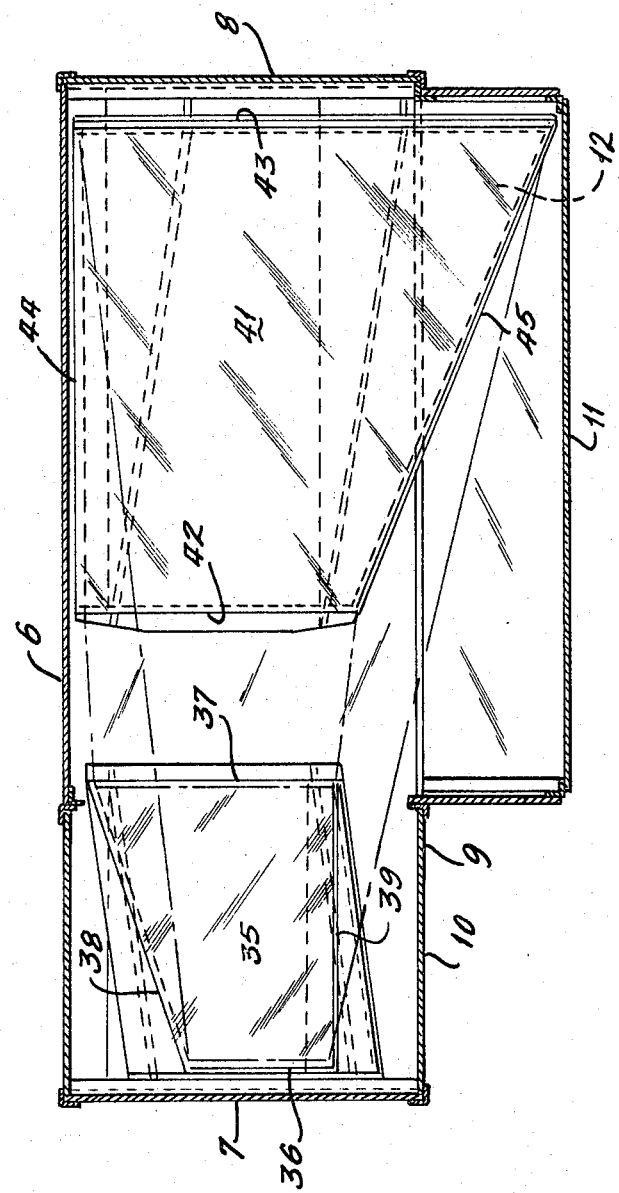

The invention also consists in the parts and in the arrangements and combinations of parts hereinafter described and claimed. In the accompanying drawings which form part of this specification and wherein like numerals and symbols refer to like parts wherever they occur:

FIG. 1 is a perspective view of a film viewing machine embodying the present invention, FIG. 2 is a rear view of the machine with the back panel removed, such as along the line 2—2 of FIG. 3, and showing the position of the two mirrors, FIG. 3 is a top plan view of the machine showing the top portion thereof, FIGS. 4 and 5 are right and left side views of the machine, partially broken, to show the positions of the mirrors, and FIG. 6 is a top plan view of the machine showing the details of the image exposure section, the top being partially removed to show the parts more clearly.

Referring now to the drawings in detail, it will be seen that the embodiment of the invention which has been illustrated comprises a film viewing machine 1 having a cabinet 2 with an image exposure section 3, an image reflecting and enlargement section 4, and a sloping top 5 which closes the cabinet 2 at the upper right and provides a convenient viewing and working surface.

The cabinet 2 has a rear wall 6, two side walls 7 and 8, and a front wall 9. The front wall 9 has a narrow vertical left portion 10 and a sloping upper right portion 11 which slopes inwardly and slightly under the sloping top 5, thereby forming an upper front wall chamber 12 in the cabinet 2. A short vertical wall 13 extends across the width of the machine 1.

A projector 14 is mounted at one side of the machine 1 and is positioned higher than the sloping top 5 and rearwardly of the vertical portion 10 of the front wall 9. The projector 14 has a casing 15 to which is attached a conduit 16 which is mounted in an upright position above the level of the sloping top 5 and receives air from a blower 17 mounted in a blower housing 18 in the upper portion of the machine 1. The casing 15 has vent openings 19 therein. A filter screen 20 closes an opening 21 in the rear wall 6 of the cabinet 2 so that only filtered air passes over the projector 14 for cooling purposes. A switch 22 is provided to turn on the projector 14.

The projector 14 is designed to receive microfilm 23 in roll or strip form and to enlarge the individual 35 mm. frames to scale to a size of 30 by 42 inches. Suitable wind up reels or other means, not shown, is provided for the microfilm so that the individual frames may be moved by hand after each frame is viewed. Each frame of the microfilm may show one or more drawings or one or more written pages of specification. The projector 14 is spaced from the sloping top 5 so that a T-square may be run along the left raised margin of the sloping top 5. The projector 14 has a meniscus lens 24 in a suitable holder 25, a heat filter 26, a condenser lens 27 and a lens 28 which bends the light, an upper pressure plate 29 and a lower pressure plate 30 for receiving the microfilm 23 therebetween. The axis 31 of the projector 14 extends in a downwardly and slightly rearwardly direction. The brightness of the image may be changed by rotating a band 32 which opens or closes a diaphragm. A flexible rubber housing 33 fits over the lens portion of the machine 1 to prevent dirt or foreign objects from getting into the lenses of the machine and into the lower cabinet and mirrors, which will be explained later.

The lower left portion 34 of the machine 1 contains a mirror 35 positioned under the projector 14 and held in a fixed position at a 45° angle to the axis 31. This mirror 35 has a special shape with its upper edge being smaller than its lower edge 37, with two diverging edges 38 and 39 therebetween. The purpose of this particular shape will be explained later, but it is designed to reflect the enlarged image from the microfilm to a second mirror.

The lower right portion 40 of the machine 1 contains a mounting for a second mirror 41 positioned rightwardly of said first mentioned mirror 35. The mirror 41 is held in position at an angle of 90° to the first mirror 35 by suitable support means. The mirror 41 has a lower edge 42 near the bottom of the machine 1 with a larger or longer upper edge 43 with two diverging edges 44 and 45 therebetween. The forward diverging edge 45 extends into the upper front wall chamber 12 formed behind the sloping portion 11 of the front wall 9. The mirror 41 is so positioned and dimensioned that it receives the reflection from the mirror 35 and reflects it to the underside of the sloping surface 5.

The mirrors 35 and 41 are face plated mirrors so that the reflection of the image is off the top surfaces thereof, and not first through the glass and then off of the bottom reflective surface thereof as in the case of a conventional mirror. Each mirror 35 and 41 is mounted on silicone rubber mountings, three in number, so that each mirror can be initially positioned and adjusted finely to its proper position.

Positioned above the larger mirror 41 is the sloping top 5 of the machine 1. This top 5 is made from transparent or translucent glass which is tinted green so as to be easy on the eyes and give a good contrasting background. The glass is preferably about one-half inch thick to prevent cracking or breaking. The top 5 is positioned perpendicularly to the axis 31 of the projector 14.

It is apparent that the foregoing film reader allows the image from a small 36 millimeter microfilm to be projected accurately onto a large plane surface 5. This surface 5 slants and is of a size normally used by draftsmen, architects, and engineers, such as 30 inches high and 42 inches wide. The enlargement section 4 is so positioned and dimensioned that the sloping surface 5 is in a convenient position for the operator, who is able to sit on a stool in front of the machine so that his knees and feet may extend under the sloping upper right portion 11 of the front wall 9. The switch 22 is mounted to the left in a convenient position, as are any wind up reels or holders which contain the microfilm 23 and which can be manually moved to show the desired frame in enlarged size on the underside of the sloping top 5.

The foregoing arrangement allows large bulky plans to be microfilmed, so that a small package of microfilm can be sent to numerous prospective bidders on a particular job. Each bidder will have a film reader 1 to enlarge the microfilm, to scale it with drafting instruments if desired, or to make any additional tracings from the image by placing tracing paper directly over the sloping glass surface 5. Thus, it becomes simple to distribute detailed specifications and plans to numerous companies for their inspection. The system saves space normally required to store large drawings, saves postage and handling of large drawings during shipment, and allows a company to seek bids from large numbers of prospective bidders at relatively low cost. This results in dollar savings, since assembling large numbers of detailed drawings and transmitting them to prospective bidders is a costly undertaking.

With the present film reader, the user may scale a drawing in the center of the sloping surface 5 and may use the same scale at the outer edges thereof. The lens and mirror arrangement are so positioned that the drawings are enlarged accurately to scale without distortion or enlargement or contraction at the outer edges of the sloping surface 5.

This invention is intended to cover all changes and modifications of the example of the invention herein chosen for purposes of the disclosure which do not constitute departures from the spirit and scope of the invention.

What is claimed is:

1. A film viewing machine comprising a cabinet containing an image exposure section at one side of its top portion and a sloping top for receiving an image at the other side of its top portion, said cabinet containing an image reflecting and enlargement section which is larger at the top than at the bottom, said image exposure section having a projector mounted above the plane of said sloping top, said projector having microfilm holding means thereon and being capable of projecting light through said microfilm into said reflecting and enlargement section, the axis of said projector extending downwardly and rearwardly, a blower positioned in said cabinet for cooling said projector, filter means forming a portion of the wall of said cabinet for filtering incoming air for cooling said projector, upstanding conduit means positioned above the plane of said sloping top connecting said blower and said projector for directing air from said blower to said projector, said cabinet having a lower front wall extending across the width of the machine and an outwardly sloping upper front wall portion in alignment with said sloping top, said image reflecting an enlargement section having two sidewalls and two mirrors therein, said mirrors positioned at the lower corners of the cabinet at an angle of 45° to the axis of said projector, each of said mirrors having an upper edge adjacent to one of said sidewalls, one of said mirrors having an upper portion extending into the space within the cabinet created by the slope of the sloping upper front wall and having its upper edge parallel to and extending along the entire length of the adjacent side wall, said top portion being translucent so that an image projected on the underside thereof may be viewed from the top.

2. A film viewing machine comprising a cabinet containing an image exposure section, said cabinet being completely enclosed to prevent foreign material from entering therein, said cabinet containing an image reflecting and enlargement section, said enlargement section being larger at the top than at the bottom, a sloping top portion for receiving the enlarged image on the underside thereof, said exposure section having microfilm holding means and a projector for projecting light through said microfilm into said reflecting and enlargement section, the axis of said projector extending downwardly and rearwardly, means positioned in said cabinet for cooling said projector, filter means forming a portion of the wall of said cabinet for filtering incoming air and cooling said projector, upstanding conduit means positioned above the plane of said sloping top portion connecting said cooling means and said projector for directing air to said projector, said cabinet having a lower front wall extending across the width of the machine and an outwardly sloping upper front wall portion in alignment with said top portion, said image reflecting an enlargement section having two side walls and two mirrors therein, said mirrors positioned at the lower corners of the cabinet at an angle of 45° to the axis of said projector, each of said mirrors having an upper edge adjacent to one of said side walls, one of said mirrors having an upper portion extending into the space within the cabinet created by the slope of the sloping upper front wall and having its upper edge parallel to and extending along the entire length of the adjacent side wall, said top portion being translucent so that an image projected on the underside thereof may be viewed from the top.

3. The film viewing machine set forth in claim 1 wherein the first mirror is positioned beneath the projector and the second mirror is positioned beneath the sloping top, said first mirror being positioned at an angle of 45° to the axis of the projector, said second mirror being positioned perpendicularly to said first mirror, the upper edge of said first mirror being smaller than the bottom edge thereof, the upper edge of said second mirror being larger than the bottom edge thereof and extending into the space provided in the cabinet created by the outwardly sloping wall.

4. The film viewing machine set forth in claim 1 wherein the first mirror is positioned beneath the projector and the second mirror is positioned beneath the sloping top, said first mirror being positioned at an angle of 45° to the axis of the projector, said second mirror being spaced from and positioned perpendicularly to said first mirror, the upper edge of said first mirror being smaller than the bottom edge thereof, the upper edge of said second mirror being larger than the bottom edge thereof, said mirrors each having diverging side edges connecting the top edge and their bottom edge, whereby the image from microfilm is enlarged and projected to scale on the underside of said top portion.

References Cited

UNITED STATES PATENTS

| | | | |
|---|---|---|---|
| 2,265,992 | 12/1941 | Beck | 88—24 |
| 2,281,988 | 5/1942 | Osterberg et al. | 88—24 |
| 2,543,561 | 2/1951 | Tracy | 33—23 |
| 2,659,267 | 11/1953 | Baule | 88—24 |
| 3,169,442 | 2/1965 | Reddle et al. | 88—24 |
| 3,225,650 | 12/1965 | Wright | 88—24 |
| 3,269,264 | 8/1966 | Cocks | 88—24 |

NORTON ANSHER, *Primary Examiner.*

RICHARD M. SHEER, *Assistant Examiner.*